United States Patent [19]
Ludeña

[11] 3,808,963
[45] May 7, 1974

[54] STEAM COOKER

[76] Inventor: Octaviano Roa Ludeña, No. 95-K-F, Kamias, Quezon City, Philippines

[22] Filed: Sept. 21, 1972

[21] Appl. No.: 290,811

[52] U.S. Cl. .................................. 99/417, 99/339
[51] Int. Cl. ........................................... A47j 27/10
[58] Field of Search...... 99/417, 339, 403, 410–411, 99/412–413, 414–415, 416, 418, 440; 126/369, 369.1, 369.2, 369.3

[56] References Cited
UNITED STATES PATENTS

| | | | |
|---|---|---|---|
| 936,965 | 10/1909 | Wells | 99/440 |
| 1,260,720 | 3/1918 | Shattuck | 99/417 |
| 2,097,478 | 11/1937 | Struble | 99/412 |
| 2,393,420 | 1/1946 | Scheuplein | 99/403 |
| 3,109,359 | 11/1963 | Falla | 99/417 X |
| 3,636,860 | 1/1972 | Green | 99/410 |

FOREIGN PATENTS OR APPLICATIONS
824,727  12/1959  Great Britain ..................... 99/417

*Primary Examiner*—Billy J. White
*Assistant Examiner*—Arthur O. Henderson
*Attorney, Agent, or Firm*—Stevens, Davis, Miller & Mosher

[57] ABSTRACT

A handled food cooker comprising an outer container, a smaller perforated container fitting within the outer container and defining a water space therebetween, a perforated steam plate positioned on the smaller container, at least one further container positionable on the steam plate and a lid covering the outer container and thereby enclosing said smaller perforated container, said steam plate and said further container.

8 Claims, 3 Drawing Figures

PATENTED MAY 7 1974  3,808,963

STEAM COOKER

This invention relates to an improved cooker, and in particular to a cooker of the type in which several types of food may be cooked simultaneously in a single vessel to effectively utilize the heat generated for cooking.

This invention is an improvement over Philippine Utility Model Patent 707 and consists in a cooker comprising an outer vessel, a perforated inner cooking vessel arranged within the outer vessel, there being a space for water provided between the said inner and said outer vessels at the lower end of the said outer vessel, a shoulder perforated steaming plate arranged above the inner vessel, and a cover for closing the outer vessel so as to wholly enclose the inner vessel and the steaming plate.

The cooker may be used for simultaneously cooking rice, boiling meat, and steaming vegetables and/or desserts. For example, rice is placed in the inner cooking vessel while meat may be boiled in the water provided in the bottom of the outer vessel, and vegetables and/or desserts may be placed on the steaming plate. In use, the water is heated to boiling and the steam produced is used to cook the rice and vegetables and/or desserts.

Such a cooker is simple in design and can be mass-produced at low cost.

The invention will be further described, by way of example only, with reference to the accompanying drawings, in which.

Figure 1:
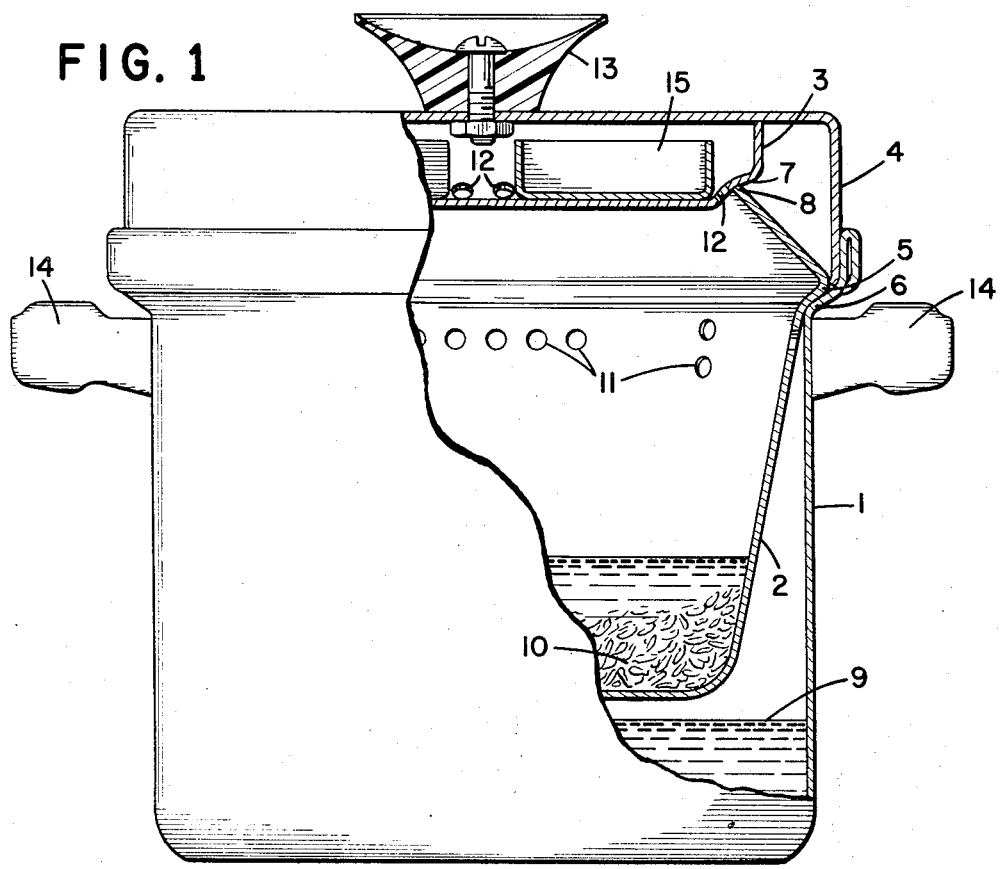
FIG. 1 is a front view, partly in section of a cooker.
Figure 2:
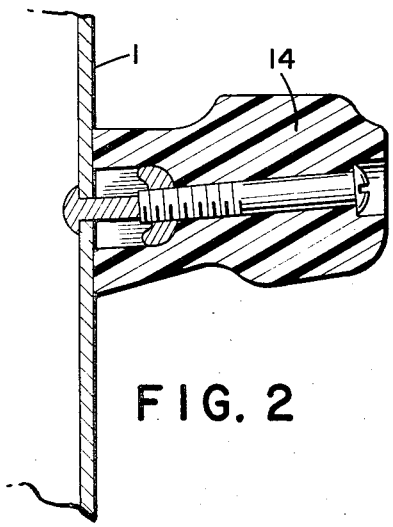
FIG. 2 is a detailed section showing the means for fitting a side handle to the cooker.
Figure 3:
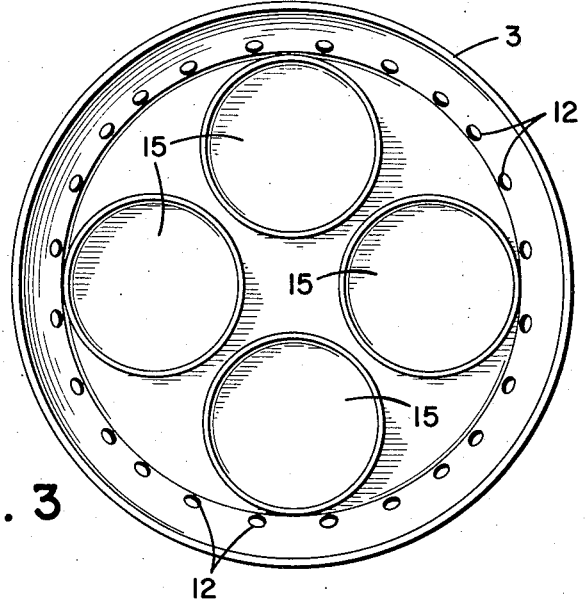
FIG. 3 is a top view of the upper compartment of the vessel and showing further containers arranged in the compartment.

In the drawings, the cooker essentially comprises a main outer vessel or heating pot 1 which is preferably cylindrical and which is provided with an inner peripheral lip 6, an inner cooking vessel 2 provided with a peripheral shoulder 5 and an upper peripheral lip 8, the vessel 2 being arranged within the vessel 1 so that the shoulder 5 rests on the lip 6, a steaming plate 3 provided with a peripheral shoulder 7 at the base thereof arranged on top of the vessel 2 so that the shoulder 7 rests on the lip 8, and a cover 4 tightly fitted over the mouth of the main vessel 1.

One or more smaller containers, for example muffin pans may be placed on the steaming plate 3 and under the cover 4. The inner cooking vessel 2 is provided with perforations 11 in the upper portion of the side wall thereof arranged in four groups of five perforations per group and in between each group are two perforations in line, and the steaming plate 3 is provided with perforations 12 in the peripheral shoulder thereof. The perforation arrangement is such as to enable all perforations to be utilized to conduct vapor from inner cooking vessel 2 through the steam plate 3. The cooking vessel 2 is arranged inside the main vessel 1 so that the respective bases of the two vessels are spaced from each other, whereby a space is provided in the bottom of the vessel 1 for containing water. A handle 13 is attached to the center of the cover 4 to facilitate opening and closing of the main vessel 1, and at least one, preferably two, side handles 14 are attached to the vessel 1 for convenience of handling by the user; handles 13 and 14 are preferably made of heat insulating material.

Advantageously, rice may be cooked in the inner vessel 2, vegetables may be cooked on the steaming plate 3 and sweets, puddings, or custard in the muffin pans 15. In addition, chicken or meat may be boiled in the water placed in the bottom of the vessel 1.

The cooking procedure is as follows:

The main vessel 1 is filled with a measured amount of water 9 such that the level of the water is about two inches from the base of the cooking vessel 2. Rinsed rice 10 is placed in the cooking vessel 2 with water about one inch from the settled grains, or following the usual method of cooking rice. The vegetables are placed on the steaming plate 3 and desserts in the muffin pans 15. As the water in the main vessel is heated to boiling a gradually increasing amount of steam is generated and passes through the perforations 11 into the vessel 2 containing the rice 10.

As the temperature increases, the amount of steam generated increases so that the rice is gradually cooked. Some of the steam passes upwards through the perforations 12 into the steaming plate 3 to cook the vegetables and desserts. As mentioned above, chicken or meat may be boiled in the water 9 while the rice is being cooked.

Although in the drawings the base of the cooking vessel 2 is spaced from the base of the main vessel 1 to define a space into which water may be placed, this arrangement is not essential. For example, the vessel 2 may extend to the bottom of the vessel 1 and annular space may be provided between the side walls of the vessels 1 and 2 at the lower end of the main vessel 1 into which water may be placed, as before.

What is claimed is:

1. A cooker comprising an outer container, a smaller perforated inner cooking container arranged within the outer container to define a space for water between said containers at the lower interior end of the said outer container, said perforated inner cooking container having the perforations positioned in the upper portion of the sidewall thereof, a steaming plate carrying a peripheral perforated shoulder positioned on the inner container, and a cover for closing the outer container thereby enclosing the inner container and the steaming plate.

2. The cooker of claim 1 wherein the base of said inner cooking container is spaced from the base of said outer container to define the said space between the inner and outer containers.

3. The cooker of claim 1 wherein said outer container is provided with an inner peripheral lip and said inner cooking container is provided with a peripheral shoulder whereby said shoulder rests on said lip to support the inner cooking container within the outer container.

4. The cooker of claim 1 wherein said inner cooking container is provided with a peripheral lip along the upper edge thereof and said steaming plate is provided with a peripheral shoulder at the base thereof whereby said shoulder rests on said lip to support the steaming plate on the inner cooking container.

5. The cooker of claim 1 wherein said cover is provided with a handle to facilitate opening and closing of the outer container.

6. The cooker of claim 1 wherein said outer container is provided with at least one handle.

7. The cooker of claim 6 wherein at least one said handle is made of heat insulating material.

8. The cooker of claim 1 including at least one further container positioned on said steaming plate and under said cover.

* * * * *